United States Patent [19]

Albrecht

[11] Patent Number: 4,953,831
[45] Date of Patent: Sep. 4, 1990

[54] EVAPORATIVE AIR COOLER

[75] Inventor: Charles W. Albrecht, Evanston, Wyo.

[73] Assignee: Cool Pet Industries, Inc., Evanston, Wyo.

[21] Appl. No.: 369,190

[22] Filed: Jun. 21, 1989

[51] Int. Cl.⁵ ............................................. F24F 3/14
[52] U.S. Cl. .............................. 261/102; 261/DIG. 4;
261/105; 62/314; 98/30
[58] Field of Search ................. 62/305, 315, 304, 314;
98/30; 261/DIG. 4, 106, 103, 105, 102

[56] References Cited

U.S. PATENT DOCUMENTS

| | | | |
|---|---|---|---|
| Re. 31,675 | 9/1984 | Vesper | 98/30 |
| 2,497,947 | 2/1950 | Lewis | 261/103 |
| 2,717,773 | 9/1955 | Gregg | 261/102 |
| 2,793,015 | 5/1957 | Thompson | 261/102 X |
| 4,204,409 | 5/1980 | Satama | 62/305 X |

Primary Examiner—Albet J. Makay
Assistant Examiner—John Sollecito
Attorney, Agent, or Firm—A. Ray Osburn

[57] ABSTRACT

A highly efficient evaporative cooler having high cooling capacity in relation to its size, wherein the incoming air is directed to flow along an evaporative pad, rather than directly therethrough, resulting in highly efficient temperature reduction of the incoming air.

18 Claims, 3 Drawing Sheets

EVAPORATIVE AIR COOLER

BACKGROUND OF THE INVENTION

1. Field:

The field of the invention is evaporative air coolers, particularly such coolers which are relatively small but nevertheless efficiently cool large volumes of air, and are also capable of efficiently cooling warm air in the higher ranges of relative humidity.

2. State of the Art:

The principle of evaporative cooling of low humidity air has been exploited for several decades in the dryer regions of the United States and other countries. Present evaporative cooling devices typically comprise a low pressure, high volume air mover, such as a squirrel cage fan, mounted within a housing which incorporates sizeable highly porous evaporation pads arranged vertically in its walls. The loosely woven fibers of the pad are wetted to provide a large surface of water for cooling evaporation. The fan is adapted for delivery of air in high volume at low pressure, and the pads are accordingly thin in thickness and extensive in area. The incoming air is cooled inefficiently because it passes too quickly through the thin pads. That is, the full evaporative potential of the air is not utilized because the dwell time in contact with the wetted fibers is too short. Also, the air wafts quite gently through the pads with little of the mixing turbulent eddying which would accompany higher velocity and promote much more efficient evaporation. Low humidity air is required for significant cooling, so that these conventional units are of little value at the humidity levels found in many areas.

The required large pad areas result in impractically large coolers for many applications, such as automobiles, boat cabins and mobile trailers, where the interior space is limited and external mounting of the cooler is not desirable.

Clearly, there is a need for a more compact, more highly efficient evaporative cooler capable of cooling large volumes of air while itself occupying minimum space, and also capable of exploiting the full cooling potential of the air in both low and high humidity ranges.

BRIEF SUMMARY OF THE INVENTION

With the foregoing in mind, the present invention eliminates or substantially alleviates the disadvantages and shortcomings in prior art evaporative air coolers. As with conventional evaporative air coolers, the inventive device comprises a housing or the like having an air entrance and an air exit, a fan impelling the air, a loosely woven fiber pad, and provisions for wetting the pad with water. However, the present device differs in arrangement of the pad and in the management of air flow. In conventional coolers, the air inlet is substantially the same size as the total area of the cooling pad. The air enters the device perpendicular to the pad, and is cooled only by its passage through the thickness of the pad. In contrast, the incoming air passage in the inventive cooler is everywhere quite small in comparison to the total area of the pad, and is arranged so that the incoming air dwells for considerable time periods and for considerable distances in contact with the pad.

Thus, the air is directed through a passage substantially as wide and as long as the pad, and bordered by at least one of the faces of the pad. Preferably, this passage, and the pad therein, is situated near and communicates with an air inlet opening in the housing near and parallel to an edge of the pad and preferably narrow and as long as the pad is wide, to immediately establish flow of air over the entire width of the pad.

With this arrangement, the incoming air is believed to eddy in and out of the pad turbulently during its course through the inlet passage. The dwell time of the air in such contact, and the velocity of contact of the air with the water on the fibers, are all greatly extended and both events result in increased evaporation. The air is then very efficiently cooled, because it becomes highly saturated with moisture.

Preferably, the pad and the inlet air passage are disposed vertically, facilitating the saturation of the pad by gravity flow of water from the top edge. However, other arrangements accomplishing the above-described flow conditions are possible and within the scope of the invention. Suitable flow baffling provisions are preferably incorporated between the interior end of the air inlet passage and the fan, to precipitate any large entrained droplets from the cooled air before it enters the fan.

It is therefore the object of the invention to provide an improved, more efficient evaporative air cooler.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
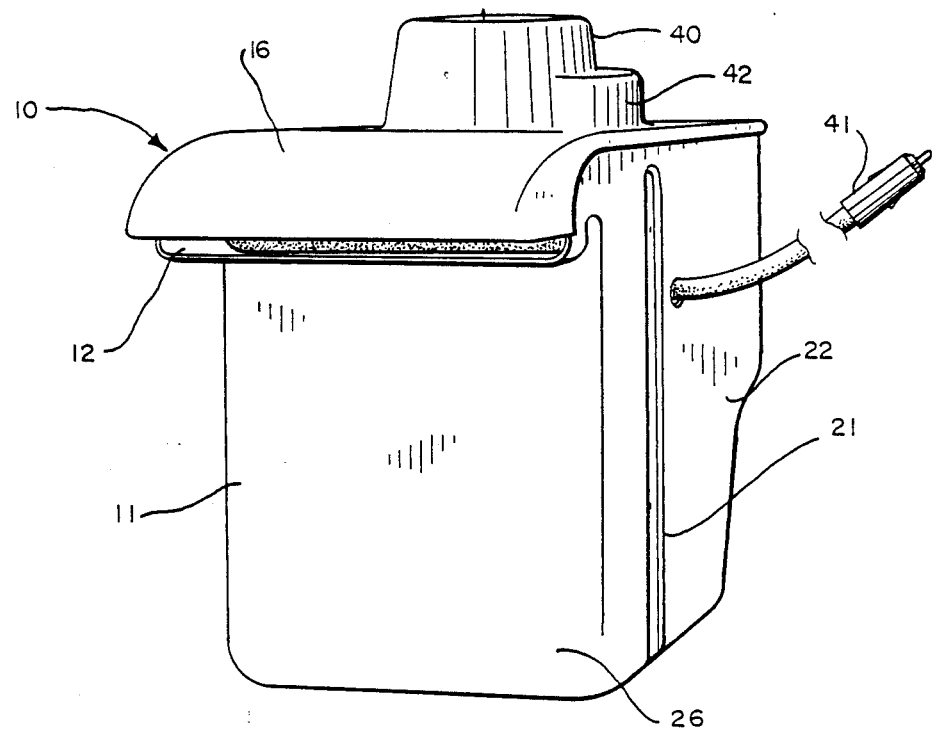
FIG. 1 is a perspective view of an evaporative air cooler in accordance with the invention, seen from the air inlet side thereof, drawn to a reduced scale, FIG. 2 a perspective view of the cooler of FIG. 1 seen from the air outlet side thereof, drawn to the same scale, FIG. 3 a vertical cross sectional view of the cooler of FIG. 2, taken along line 3—3 thereof, drawn to substantially the same scale, FIG. 4 a plan view of the pad wetting header pipe of the cooler of FIG. 3 as seen from the bottom, drawn to a somewhat larger scale than FIG. 3, FIG. 5 a plan view of a fragment of the pump of the cooler of FIG. 3 as seen from the bottom, showing a portion of the water outlet hose, drawn to a somewhat larger scale than FIG. 3, FIG. 6 a perspective view of the evaporative cooler of FIG. 1 with its top cover removed, showing the installation of the blower, the evaporative pad, and other internal details, drawn to a slightly reduced scale, and FIG. 7 a top plan view of the cooler of FIG. 6, with the fan removed therefrom, exposing the pump, the water hose, and the internal air baffle, drawn to the same scale.
Figure 2:
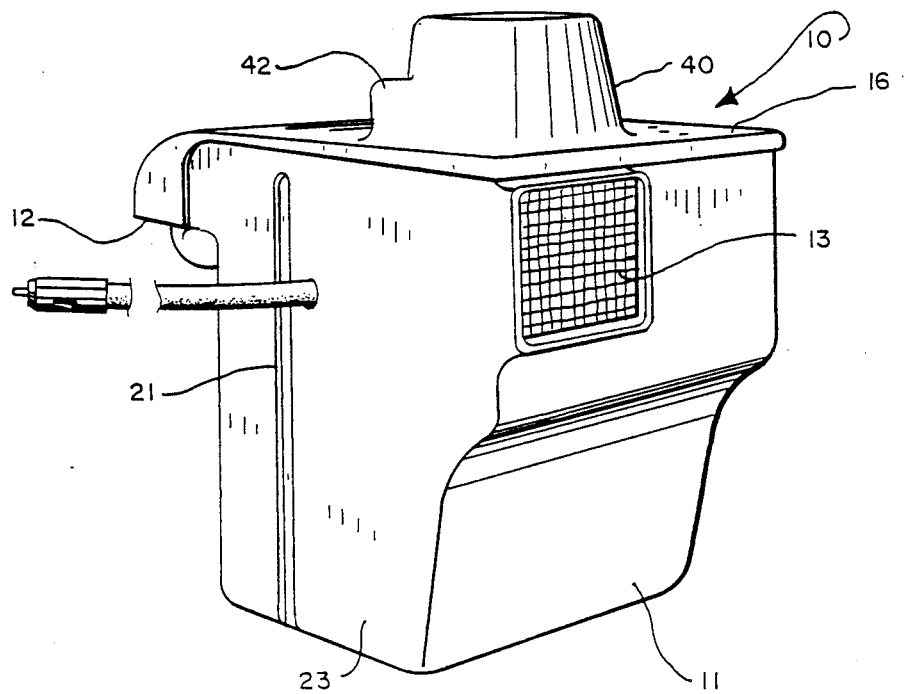

Illustrated in the drawings is an embodiment of the inventive evaporative air cooler 10 adapted to cool the interior of an automobile, truck cab or the like. Air cooler 10 comprises a generally sealed housing 11 with an elongate horizontal air inlet 12 and an air outlet 13 connected to air blower 14 mounted inside housing 11. Air inlet opening 12 extends horizontally the full width of housing 11, which is built with an outward projection shaped to hang the cooler within a vehicle supported upon the upper edge of the glass of a window. (FIGS. 1-3, 6, 7) Fan 14 is advantageously the squirrel cage type, selected for its well-known ability to impel large volumes of air at low pressures. A bulkhead 15 extends fully across the interior of housing 11 and downwardly from housing top cover 16, to terminate with its lowermost edge 17 spaced somewhat upwardly from the surface of water 18 in bottom reservoir portion 19. Bulkhead 15 is restrained from being pushed toward low pressure fan inlet chamber 20 by a pair of vertical ribs 21 formed into housing sides 22 and 23, and is secured airtight by water proof glue 24 to housing 11 along its upper and side edges. An air flow baffle portion 25 is formed by hot folding of bulkhead plate 15.

Bulkhead 15, with facing vertical wall 26 of housing 11, forms an air inlet passage 27, partially occupied by a vertically placed evaporation pad 28. Pad 28 extends horizontally and vertically substantially fully across the interior of housing 11, supported by wire ties 29 to substantially open expanded aluminum sheet 30 with supporting bottom lip 31. However, a substantial portion 32 of passage 27 is left open and free, unoccupied by pad 28. Expanded aluminum sheet 30 prevents the collapse or tilting of pad 28 across passage 27. Pad 28 comprises a three dimensional matrix of widely spaced fibers, and is quite similar to conventional evaporative cooling pads. Preferably, however, it is selected from among those available pads which do not swell in thickness when wetted, so that open passage portion 32 remains constant in width and unimpeded. Otherwise, appropriate allowance in passage width must be made in the design of cooler 10.

Figure 4:
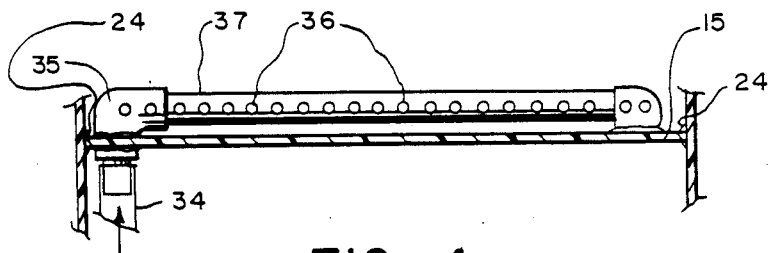
Figure 5:
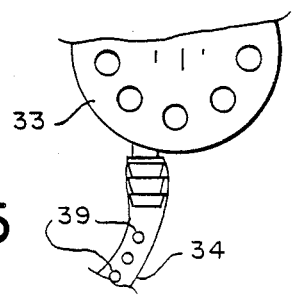
Figure 6:
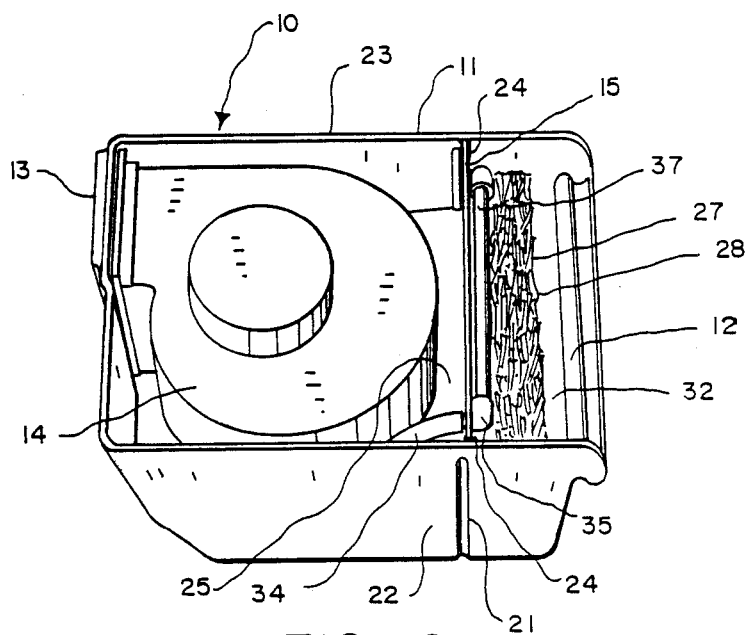
Figure 7:
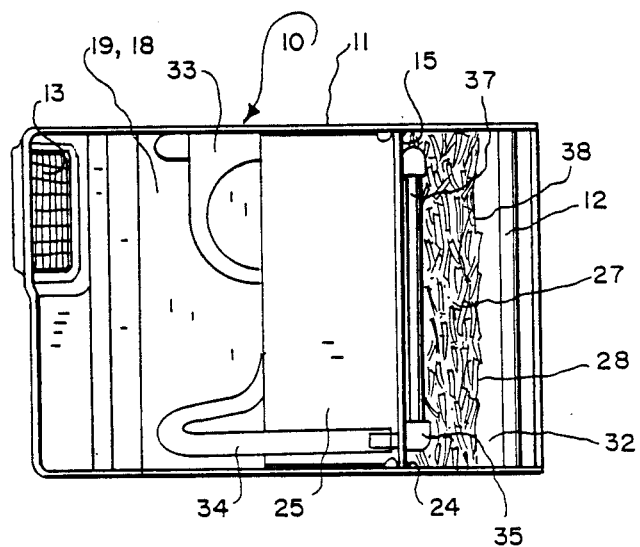

During operation of air cooler 10, pad 28 is wetted by water 18 lifted from reservoir 19 by a pump 33 through a hose 34 and an elbow nipple 35, from which it emerges through downward facing orifices 36 spaced along the lowermost side of a closed end header pipe 37. (FIG. 4) Orifices 36 are sized for substantially equal flow rate through each, in order to uniformally wet pad 28 all across its width. Water from header 37 drains downwardly through pad 28 to thoroughly wet its fibers from top edge 38 to the water 18 in reservoir 19. To avoid flooding pad 28 from excess pump capacity, a pair of bypass openings 39 may be required with some pumps to limit the amount of water flowing to header 37. The total flow of water from pump 33 is in this event divided between immediate return to reservoir 19 through bypasses 39 and flow through orifices 36. (FIG. 5) Top cover 16 has an upward hollow projecting portion 40 for clearance of the motor of fan 14. For most vehicle applications, a 12 volt DC motor is preferably provided, accommodated by a cigarette lighter plug 41. For other applications, 120 volt AC motors may be employed. Lobe 42 on projection 40 provides necessary clearance for A motors.

Figure 3:
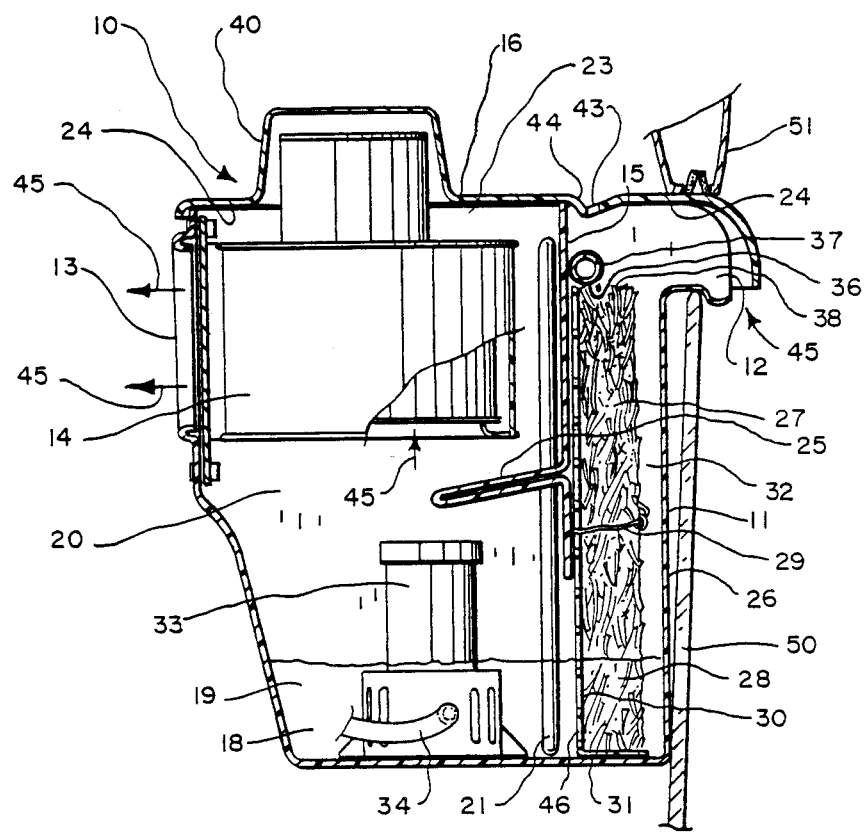

In preparation for operation, water 18 is funneled into housing 11 through fill hole 43 in trough 44 formed in top cover 16. The fill water wets pad 28 preliminary to operation, and charges reservoir 19 to a point somewhat below bottom edge 17 of bulkhead 15. (FIG. 3)

During operation, fan 14 expels air from the interior of housing 11, and draws air thereinto through air inlet 12. However, in contrast to conventional evaporative coolers, incoming air 45 is not permitted to flow directly and rapidly perpendicularly through the entire pad area to fan chamber 20. Instead, the incoming air 45 must in cooler 10 flow downwardly from air inlet 12 through air inlet passage 27 before eventually passing perpendicularly through the reduced area 46 of pad 28 below the bottom edge 17 of bulkhead 15 and above the water 18. Passage 27 extends substantially the entire vertical extent of both housing 11 and pad 28, and is equal in width to said pad. Thus, the incoming air 45 remains in contact with evaporative pad 28 for a distance many times the corresponding contact distance employed in conventional evaporative coolers. Accordingly, much more evaporative surface is utilized.

Additionally, substantially higher velocity and greatly increased dwelling time in contact with pad 28 may both be utilized because of the extended length of air inlet path. The pressure differential across fan 14, although greater than in conventional systems, remains acceptably low. Both the higher velocity and the extended dwell time greatly increase the efficiency of evaporation and therefore the degree of cooling achieved. It is speculated that much of the incoming air eddies turbulently repeatedly in and out between open passage 32 and the inter-fiber spaces of pad 28. This sustained scrubbing is believed to entrain sufficient water for virtually complete vapor saturation of the incoming air. This is believed to occur entirely in passage 32. In any event, it must be presumed to be completed after dwell in fan chamber 20, because of the very large temperature reduction observed.

Presumably, the interrelationships, requirements and limits of such design factors as the thickness of pad 28, the thickness of free-flow passage 32, the length of the latter and the flow velocity therein, are important for best design, but are not presently established. It seems very clear, however, that great increases in cooling performance ensue from causing the air to flow along the pad for considerable distances, as opposed to its flowing directly through the thickness of pad 28.

Regardless of whatever mechanisms are responsible, unexpectedly efficient, very dramatic, cooling performance has been observed. In one test, a full 30° F. temperature reduction was achieved, from 110° to 80° F. The relative humidity was 15%. In another test, significant cooling was achieved, 96° F. to 88° F., with air of relative humidity of fully 90%. In conventionally designed evaporative coolers, only 8° to 12° F. temperature reduction may be expected, and only when the relative humidity is in the lower ranges. In actual space cooling performance, device 10 has thoroughly excelled over the best of much larger conventional coolers. The utility of the device even with high humidity air, and the outstanding cooling efficiency with lower humidity air is completely at odds with conventional beliefs about the performance achievable with evaporative air cooling.

The very high cooling efficiency, of course, is advantageous in that it permits cooler 10 to be much smaller than possible with state of the art cooler design, so that it can be better utilized for limited spaces. Examples are the interior of vehicles, or house trailers or individual rooms within larger structures.

Perhaps because the saturation of the incoming air is so complete, large water droplets are sometimes entrained in the air emerging from area 46 of pad 28 above water 18 in reservoir 19. These are objectionable if allowed to be expelled by fan 14 into the space being cooled. Baffle 25 removes objectionably large droplets. Speculatively, this results from impingement of the drops upon baffle 25, or from increase of the length of the flow path to fan 14, providing increased time for gravity fallout, or for further evaporation of airborne droplets, in the event that the air is still slightly short of complete vapor saturation. The proper combination of length, angle of installation, and vertical position of baffle 25 must be experimentally determined for most effective performance. It is noted that droplets in the emerging air too small to impinge upon and wet objects in the space being cooled may not be undesirable. In fact, they may even enhance the cooling by subsequent evaporation in the atmosphere of the cooled space.

As previously mentioned, housing 11 provides for mounting cooler 10 upon the window of a vehicle. (FIG. 3) A horizontal hanger projection 47 is provided, crossed by a downstanding rib 48 creating a notch 49. Cooler 10 is supported by engagement of notch 49 upon the upper edge of window glass 50. The outer surface of wall 26 rests horizontally against the vertical glass. Glass 49 is normally raised until substantially closed, with top cover 16 in contact with the jam and seal 51. A window distant from the cooler is partially opened for circulation of the cooled air throughout the vehicle. Hanger projection 48 cooperates with a downwardly curved portion 52 of top cover 16 to provide the elongate air inlet 12 opening downwardly in a substantially horizontal plane, reducing the ingestion of rain, airborne dust and the like into cooler 10.

The invention may be embodied in other configurations and embodiments without departing from its spirit or principle. For example, the device design need not be limited to a single evaporative pad 28. A pair or more of such pads could be employed, perhaps with open-flow passage 32 contained therebetween. Also, pad 28 is not necessarily disposed vertically as illustrated, although such arrangement is advantageous and definitely preferred. Cooler 10 could employ one or more horizontal pads and remain within the spirit of the invention, for example.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by U.S. Letters Patent is:

1. An evaporative air cooling device, comprising:
   means defining an air flow passage;
   air blower means mounted to cause air to flow through the passage;
   an evaporation pad having a thickness substantially smaller than at least one of its length and width, said thickness being defined by an upstream surface and an opposing surface of the pad, the pad being installed in a portion of the passage, said portion being shaped and sized to generally conform to the length and width of the pad and to be substantially greater in width than the thickness of the pad in the direction of said thickness, so that an unimpeded flow channel of substantial cross sectional area is provided through said portion of the passage, said channel extending substantially both the length and the width of the pad and being bordered on at least one of its sides the upstream surface of the pad; and
   means wetting the pad with water without prior contact of the water with a stream of air to be cooled.

2. The evaporative air cooling device of claim 1, wherein the passage further comprises:
   a dwell portion downstream of the pad portion, so that airborne droplets entrained from the pad will tend to be further evaporated as the air flows therethrough.

3. The evaporative air cooling device of claim 2, wherein:
   the dwell portion of the passage is situated in parallel relationship with the pad portion.

4. An evaporative air cooling device, comprising:
   a generally sealed housing comprising exterior wall members enclosing a space therewithin, and having an air inlet opening and an air outlet opening;
   air blower means mounted to cause air to flow through the housing;
   an evaporation pad having a thickness substantially smaller than at least one of its length and width;
   an air passage within the housing along with means directing the air to flow therethrough as it passes through the housing, the pad being installed in said passage, and said passage being shaped and sized to generally conform to the length and width of the pad and to be substantially greater in width than the thickness of the pad in the direction of said thickness, so that an unimpeded flow channel of substantial cross sectional area is provided through said portion of the passage, said channel extending substantially both the length and the width of the pad and being bordered on at least one of its sides by the upstream surface of the pad; and
   means wetting the pad with water without prior contact of the water with a stream of air to be cooled.

5. The air cooling device of claim 4, wherein:
   the pad containing air passage within the housing is an air inlet passage communicating with the air inlet opening.

6. The air cooling device of claim 5, wherein:
   the housing further comprises an interior wall which generally divides the interior of the housing into the air inlet passage and a downstream air outlet passage communicating with the air outlet opening.

7. The air cooling device of claim 6, wherein:
   the air blower is mounted within the air outlet passage connected to the air outlet opening.

8. The air cooling device of claim 6, wherein:
   the inlet passage is vertical; and
   the pad is wetted by gravity flow of water downwardly from its topmost edge.

9. The air cooling device of claim 8, wherein:
   the interior wall extends horizontally the full width of the housing and vertically a substantial portion of the full height of the housing; and
   the air inlet opening is situated near the top of the housing, so that the incoming air flows downwardly through the inlet passage.

10. The air cooling device of claim 9, further comprising:
    an air flow baffle in the outlet passage, placed and sized to cause the removal of objectionably sized airborne droplets of water from the flow of air.

11. The air cooling device of claim 10, wherein:
    the pad extends downwardly beyond the interior wall toward the bottom of the housing, so that the incoming air emerges from the inlet passage horizontally through the pad.

12. The air cooling device of claim 9, further comprising:

a water pump situated at the bottom of the interior of the housing, along with a discharge hose communicating with the uppermost edge of the pad; so that water may be pooled in the bottom of the housing and circulated to wet the pad.

13. The air cooling device of claim 10, further comprising:

a water pump situated at the bottom of the interior of the housing, along with a discharge hose communicating with the uppermost edge of the pad; so that water may be pooled in the bottom of the housing and circulated to wet the pad.

14. The air cooling device of claim 12, further comprising:

a water header pipe mounted along the uppermost edge of the pad the full length thereof, having a plurality of water outlet holes spaced apart along its full length, said header being connected to the pump discharge hose, so that the pad may be uniformly wetted across its width.

15. The air cooling device of claim 13, further comprising:

a water header pipe mounted along the uppermost edge of the pad the full length thereof, having a plurality of water outlet holes spaced apart along its full length, said header being connected to the pump discharge hose, so that the pad may be uniformly wetted across its width.

16. The air cooling device of claim 14, wherein:

the air inlet opening extends horizontally substantially the full width of the housing.

17. The air cooling device of claim 16, wherein the housing further comprises:

a horizontally projecting portion carrying the air inlet opening, said projecting portion being adapted for hanging the cooling device upon the uppermost edge of vehicle window glasses and the like.

18. The air cooling device of claim 17, wherein:

the air inlet opening is situated on the bottom side of the projecting portion.

* * * * *